(12) United States Patent
Kim

(10) Patent No.: US 12,166,214 B2
(45) Date of Patent: Dec. 10, 2024

(54) CURRENT COLLECTOR FOR ELECTRODE

(71) Applicant: U & S ENERGY, INC., Jeollabuk-do (KR)

(72) Inventor: Kyung Joon Kim, Daejeon (KR)

(73) Assignee: U & S ENERGY, INC., Jeollabuk-do (KR)

( * ) Notice: Subject to any disclaimer, the term of this patent is extended or adjusted under 35 U.S.C. 154(b) by 890 days.

(21) Appl. No.: 17/258,571

(22) PCT Filed: Jul. 18, 2019

(86) PCT No.: PCT/KR2019/008886
§ 371 (c)(1),
(2) Date: Jan. 7, 2021

(87) PCT Pub. No.: WO2020/022699
PCT Pub. Date: Jan. 30, 2020

(65) Prior Publication Data
US 2021/0273231 A1 Sep. 2, 2021

(30) Foreign Application Priority Data
Jul. 27, 2018 (KR) .................. 10-2018-0088069

(51) Int. Cl.
*H01M 4/66* (2006.01)
*H01M 50/536* (2021.01)
(52) U.S. Cl.
CPC ........... *H01M 4/667* (2013.01); *H01M 4/661* (2013.01); *H01M 4/668* (2013.01); *H01M 50/536* (2021.01)

(58) Field of Classification Search
CPC ............. H01M 50/533; H01M 50/536; H01M 50/538; H01M 50/531; H01M 50/534; H01M 4/668; H01M 4/667
See application file for complete search history.

(56) References Cited

U.S. PATENT DOCUMENTS

| | | | | |
|---|---|---|---|---|
| 2004/0126663 | A1* | 7/2004 | Sudano | H01M 10/052 429/234 |
| 2006/0105243 | A1* | 5/2006 | Okamura | H01M 4/668 429/234 |
| 2007/0037060 | A1 | 2/2007 | Lee et al. | |
| 2017/0162855 | A1* | 6/2017 | Kim | H01M 50/406 |

(Continued)

FOREIGN PATENT DOCUMENTS

| CN | 106531965 A | * | 3/2017 | ........ H01M 10/0525 |
|---|---|---|---|---|
| CN | 108963311 A | * | 12/2018 | ............ H01M 10/04 |

(Continued)

OTHER PUBLICATIONS

Asako et al., WO-2012118127 Machine Translation (Year: 2012).*

(Continued)

*Primary Examiner* — Ula C Ruddock
*Assistant Examiner* — Anna Korovina
(74) *Attorney, Agent, or Firm* — NKL Law; Jae Youn Kim

(57) ABSTRACT

The current collector for electrodes according to an embodiment of the present invention includes a polymer film; at least one metal element provided on at least one surface of the polymer film; a conductive material provided on surfaces of the polymer film and the metal element; and a lead tab which is bonded or connected to the metal element.

14 Claims, 17 Drawing Sheets

(56) References Cited

U.S. PATENT DOCUMENTS

| | | | | |
|---|---|---|---|---|
| 2018/0159136 A1* | 6/2018 | Shiozaki | ............... | H01M 4/661 |
| 2020/0020952 A1* | 1/2020 | Zhang | ................. | H01M 50/116 |

FOREIGN PATENT DOCUMENTS

| | | | | | |
|---|---|---|---|---|---|
| EP | 2892097 A1 | | 7/2015 | | |
| JP | 11102711 A | * | 4/1999 | | |
| JP | 2012048852 A | * | 3/2012 | | |
| JP | 2017-216160 A | | 12/2017 | | |
| KR | 10-2006-0102745 A | | 9/2006 | | |
| KR | 10-2008-0044739 A | | 5/2008 | | |
| KR | 10-2014-0131115 A | | 11/2014 | | |
| KR | 10-2015-0140619 A | | 12/2015 | | |
| KR | 10-2017-0111994 A | | 10/2017 | | |
| KR | 10-2018-0037898 A | | 4/2018 | | |
| WO | 02/101849 A2 | | 12/2002 | | |
| WO | 2012102220 A1 | | 8/2012 | | |
| WO | WO-2012118127 A1 | * | 9/2012 | ............ | H01M 2/266 |
| WO | 2015/057024 A1 | | 4/2015 | | |

OTHER PUBLICATIONS

Kosaka et al., JP-11102711 Machine Translation (Year: 1999).*
Iizuka et al., JP-2012048852 Machine Translation (Year: 2012).*
Fu et al., CN-106531965 Machine Translation (Year: 2017).*

* cited by examiner

CURRENT COLLECTOR FOR ELECTRODE

TECHNICAL FIELD

The present invention relates to a current collector for electrodes, and more particularly, to a current collector for electrodes which is capable of reducing a weight of an electrode and reducing a thickness of an electrode assembly without using a metal foil.

BACKGROUND ART

In accordance with the development of a technology for mobile devices and increase of the demands for the mobile devices, demands for secondary batteries as an energy source have been increased. Among the secondary batteries, a lithium secondary battery which shows a high energy density, an operating potential, and has a low self-discharging rate is commercially available.

The lithium metal secondary battery is the first commercialized secondary battery and uses a lithium metal as an anode. However, since the lithium metal secondary battery has problems such as volume expansion of cells due to lithium dendrites formed on the surface of the lithium metal anode, gradual decrease in capacity and energy density, short-circuit generated due to the steady growth of dendrites, and reduction of cycle life and generation of cell stability issue (explosion and ignition), the production of lithium metal secondary battery has stopped only a few years after the commercialization thereof. Instead of the lithium metal, a carbon-based anode, which is more stable and may stably store lithium as an ion state in a lattice or an empty space, has been used and due to the use of the carbon-based anode, the full-scale commercialization and dissemination of the lithium secondary battery has progressed.

The lithium secondary battery is mainly formed of carbon-based or non-carbon-based anode materials until today and the development of the most anode materials is focused on a carbon-based material such as graphite, hard carbon, or soft carbon and a non-carbon-based material such as silicon, tin, or titanium oxide.

In the meantime, recently, as the sizes of portable electronic devices and information communication devices are being reduced, it is highly expected to use lithium secondary batteries as an ultra-small power system which drives the portable electronic devices and the information communication devices.

Moreover, recently, development and studies of polymer-based electronic devices and elements using advantages such as flexibility, low cost, ease of manufacture are being actively conducted. Accordingly, in order to be used for the small-sized devices, the thickness or the weight of the lithium secondary battery needs to be reduced while maintaining the energy density or the performance.

Further, even though the thickness or the weight of the lithium secondary battery is reduced, when an internal short-circuit occurs, a current path needs to be blocked or broken to increase the stability of the lithium secondary battery.

The applicant proposed the present invention to solve the above-described problems.

Related Art Document is Korean Patent Application Publication No. 10-2018-0037898 (Apr. 13, 2018).

DISCLOSURE

Technical Problem

The present invention has been proposed to solve the problems as described above and provides a current collector for electrodes with a reduced thickness as compared with a current collector formed of a metal foil.

The present invention provides a current collector for electrodes with a reduced weight as compared with a current collector formed of a metal foil.

Further, the present invention provides a current collector for electrodes which has a resistance higher than a resistance of a current collector formed of a metal foil to lower a short current when an internal short-circuit occurs.

Technical Solution

According to an aspect of the present invention, a current collector for electrodes includes a polymer film; at least one metal element provided on at least one surface of the polymer film; a conductive material provided on surfaces of the polymer film and the metal element; and a lead tab which is bonded or connected to the metal element.

The metal element may be provided in the form of a thin film, a foil, a mesh, a wire, or a fiber.

The metal element may be formed to ensure a welding position of the lead tab or serve as an electric path which ensures the conductivity when the polymer film is long.

A surface treatment including a chromate treatment may be performed on one surface of the metal element which faces the polymer film.

An adhesive film may be formed on one surface of the metal element which faces the polymer film.

A surface treatment may be performed on the surface of the polymer film to increase an adhesiveness or a binding force with the conductive material.

The conductive material may be provided with metal or a conductive material and is formed to be plated or coated on the surface of the polymer film.

The conductive material may be formed to adjust or lower a limit current or a maximum current of the current collector for electrodes.

The lead tab may be welded to the metal element to be electrically connected to the metal element and the conductive material.

The metal element and the conductive material may be provided on both surfaces of the polymer film and the metal elements provided on both surfaces of the polymer film may be formed on the same position.

When the lead tab is welded to any one of the metal elements provided on both surfaces of the polymer film, the polymer film may be melted to allow the metal elements provided on both surfaces of the polymer film to be connected to each other so that the lead tab is simultaneously and electrically connected to the conductive materials provided on both surfaces of the polymer film.

A tab cover member which covers the lead tab may be provided on the polymer film and the tab cover member may be formed to be in contact with the conductive material, the metal element, and the lead tab.

The tab cover member may include a conductive material to electrically connect the metal element and the conductive material or enhance the conductivity between the metal element and the conductive material.

The tab cover member may include a first layer formed of the conductive material and a second layer which is provided on a top surface of the first layer and is formed of a non-conductive material and the first layer may be provided to be in contact with the conductive material, the metal element, and the lead tab.

The tab cover member may be provided to cover the metal element and the conductive material provided on one surface of the polymer film which faces the lead tab to electrically connect the metal element and the conductive material or enhance the conductivity between the metal element and the conductive material.

Advantageous Effects

The current collector for electrodes according to the present invention uses a polymer film formed of an insulator, instead of a metal foil, so that weights of the current collector and the battery may be reduced.

Further, in the current collector for electrodes according to the present invention, instead of the usage of the metal foil, a conductive material is coated or a plating layer is formed on a surface of the polymer film so that the thickness may be reduced as compared with the current collector for electrodes formed of a metal foil.

Further, the current collector for electrodes according to the present invention has a resistance higher than the resistance of the current collector formed of a metal foil and the current flow may be interrupted due to the damage of the polymer film so that the short current may be lowered when the internal short-circuit occurs and the stability of the battery may be improved.

MODE FOR INVENTION

Figure 1:
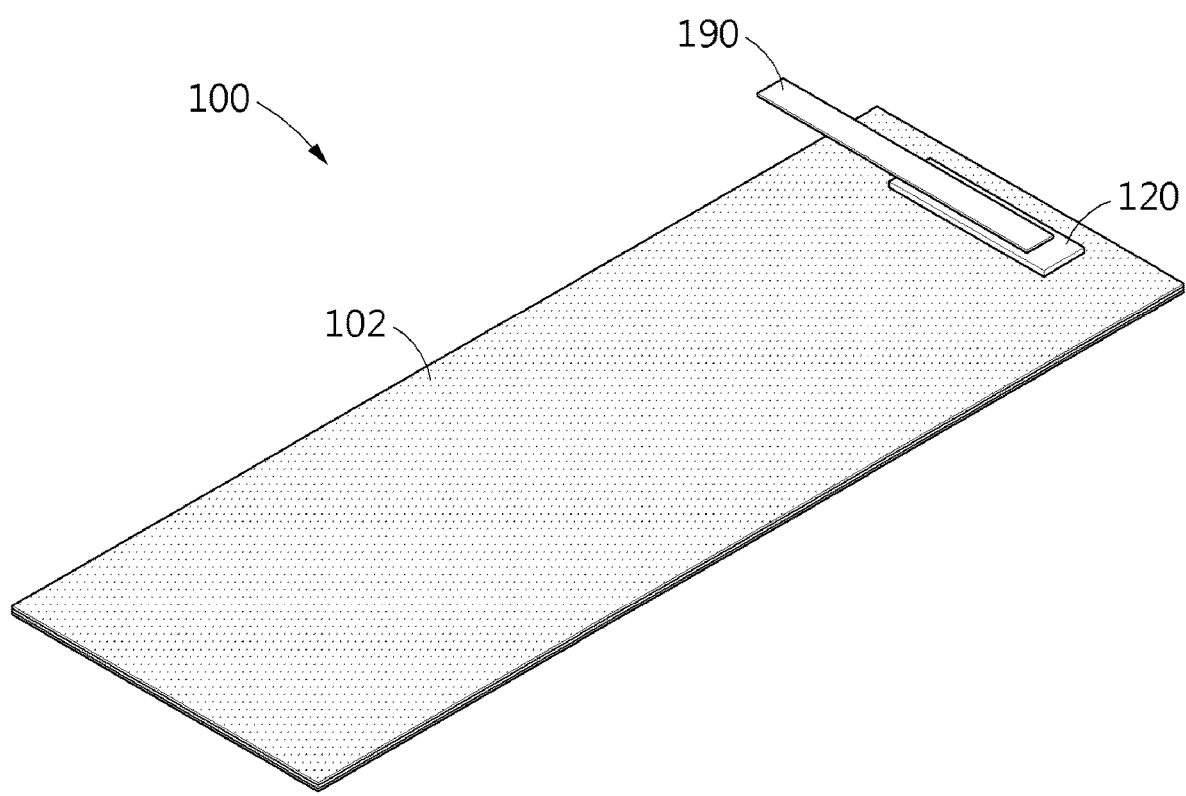
FIG. 1 is a perspective view illustrating a current collector for electrodes according to an embodiment of the present invention.

Hereinafter, exemplary embodiments of the present invention will be described in detail with reference to the accompanying drawings. However, the present invention is not restricted or limited by the exemplary embodiments. In each of the drawings, like reference numerals denote like elements.

Figure 2:
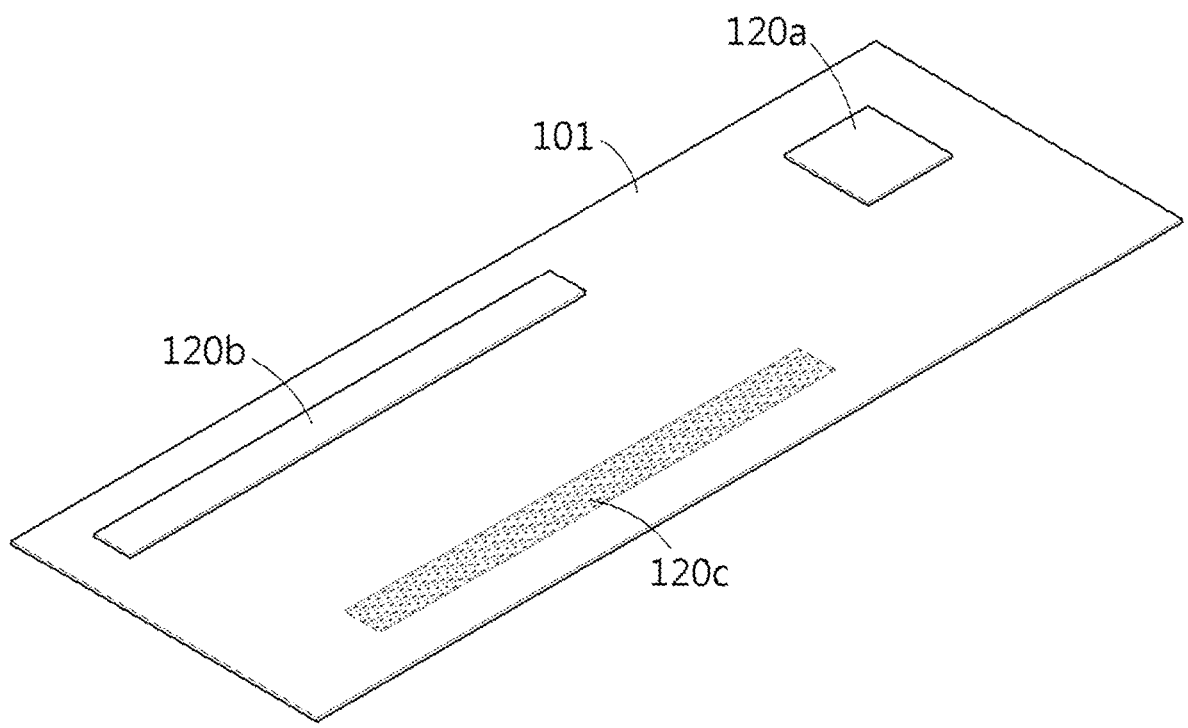
FIG. 2 is a perspective view illustrating a polymer film and a metal element of a current collector for electrodes according to an embodiment of the present invention.
Figure 8:
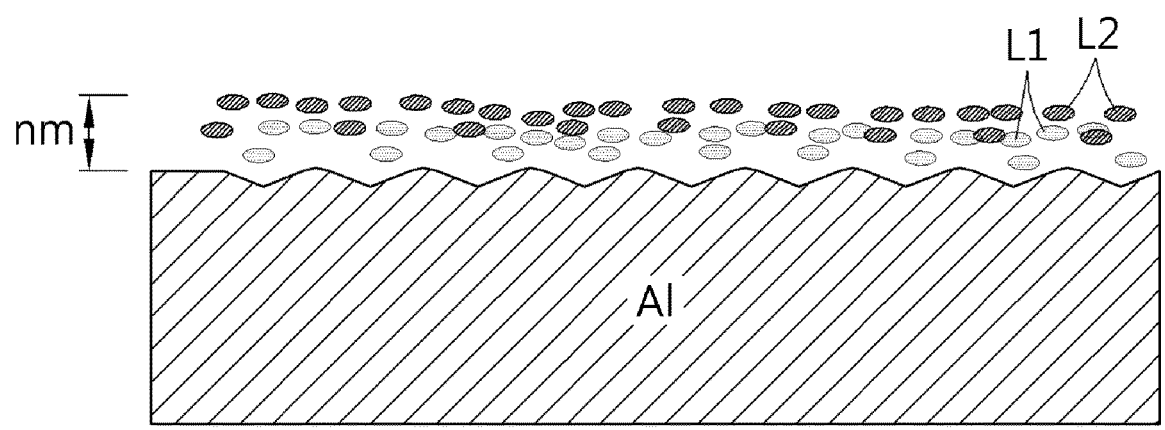
FIGS. 8 and 9 are views for explaining a surface treatment of a current collector for electrodes according to an embodiment of the present invention.
Figure 9:
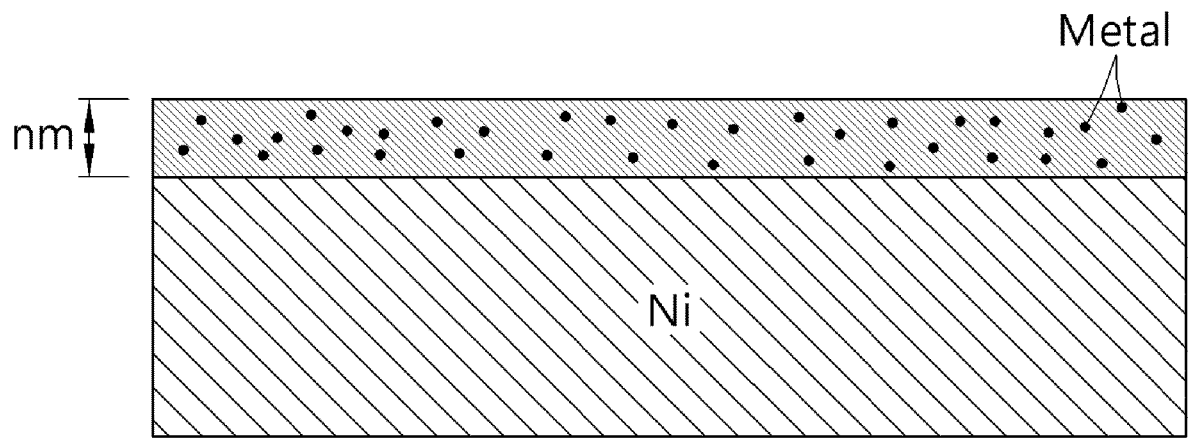
Figure 10:
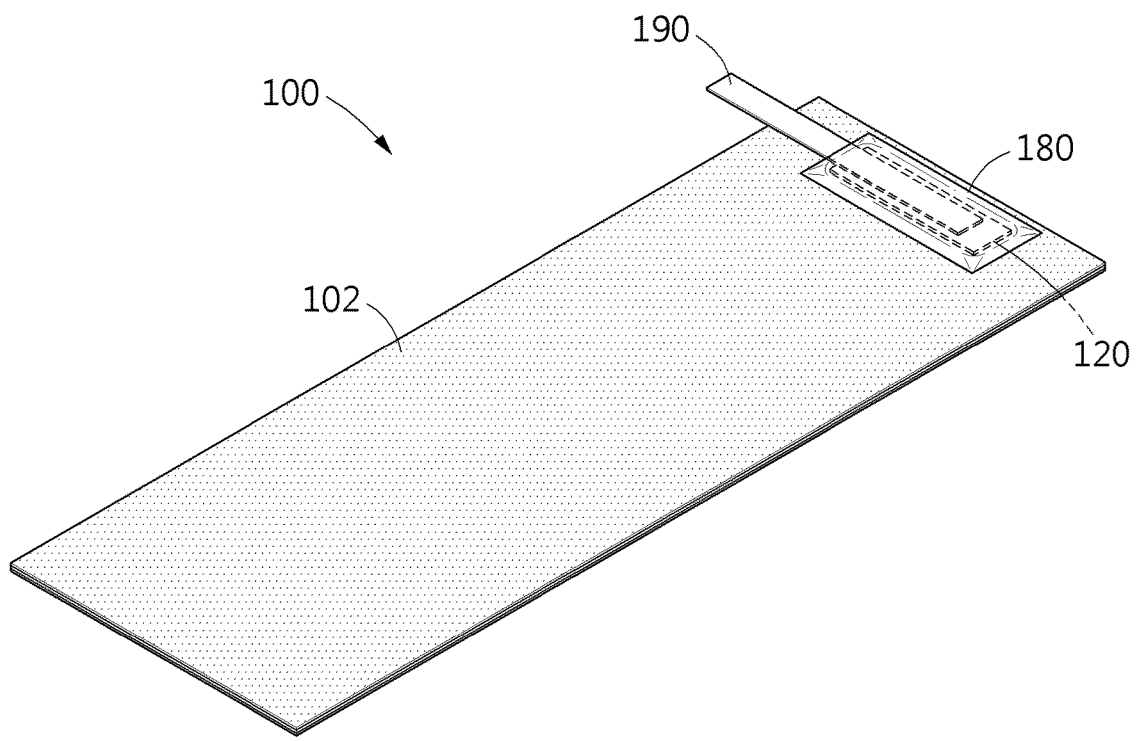
FIG. 10 is a perspective view illustrating a current collector for electrodes according to another embodiment of the present invention.
Figure 11:
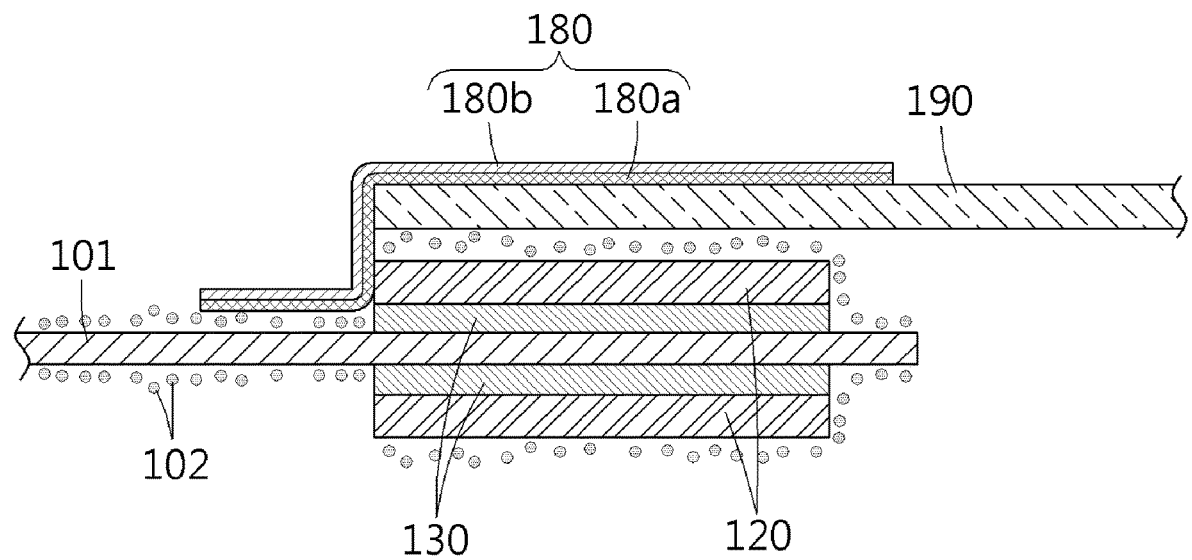
FIGS. 11 and 12 are cross-sectional views illustrating a lead tab and a tab cover member of a current collector for electrodes of FIG. 10.
Figure 12:
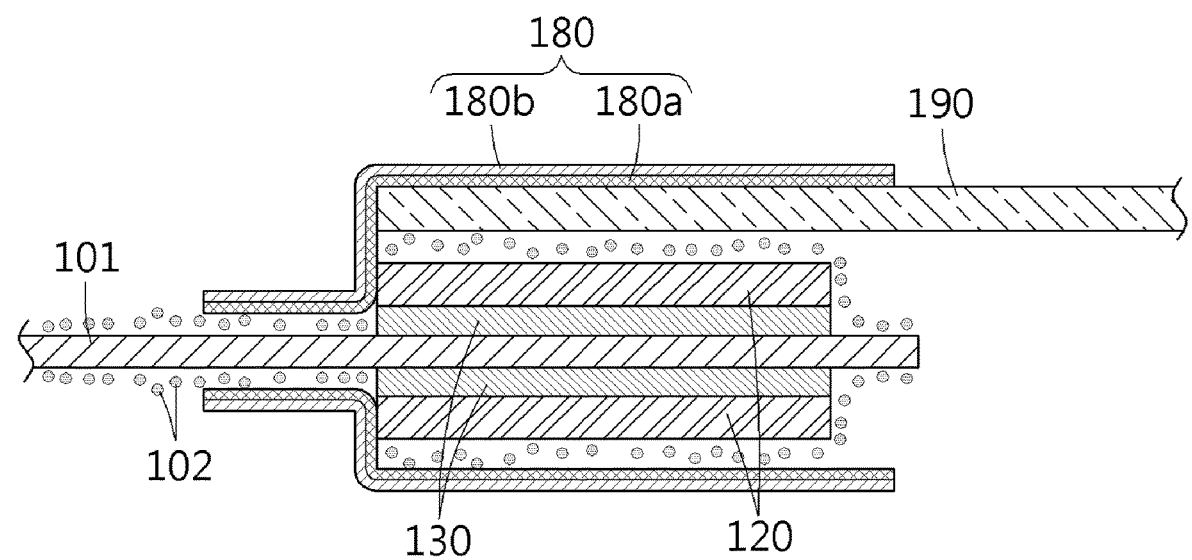
Figure 13:
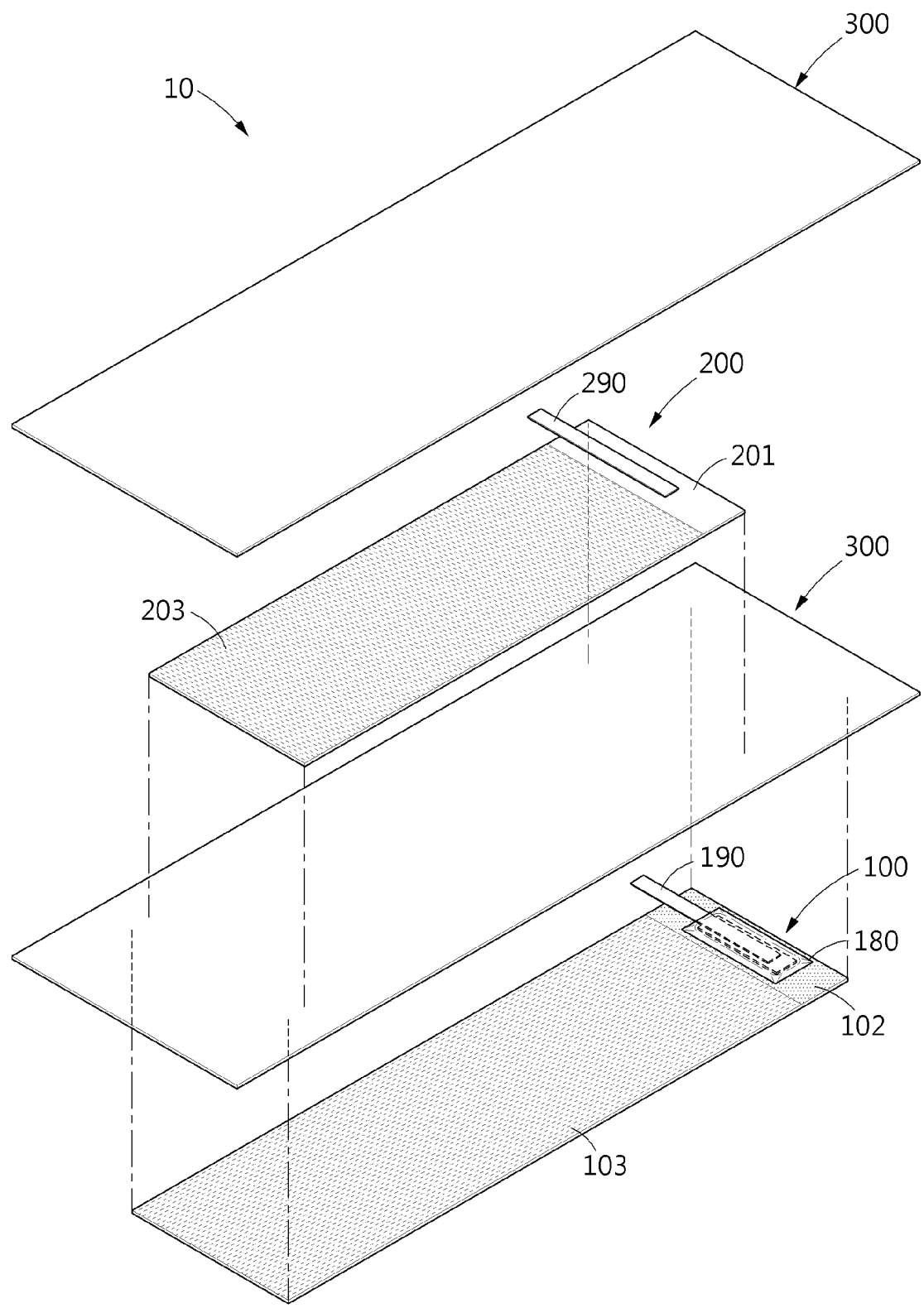
FIG. 13 is an exploded perspective view illustrating an electrode assembly including a current collector for electrodes of FIG. 10.
Figure 14:
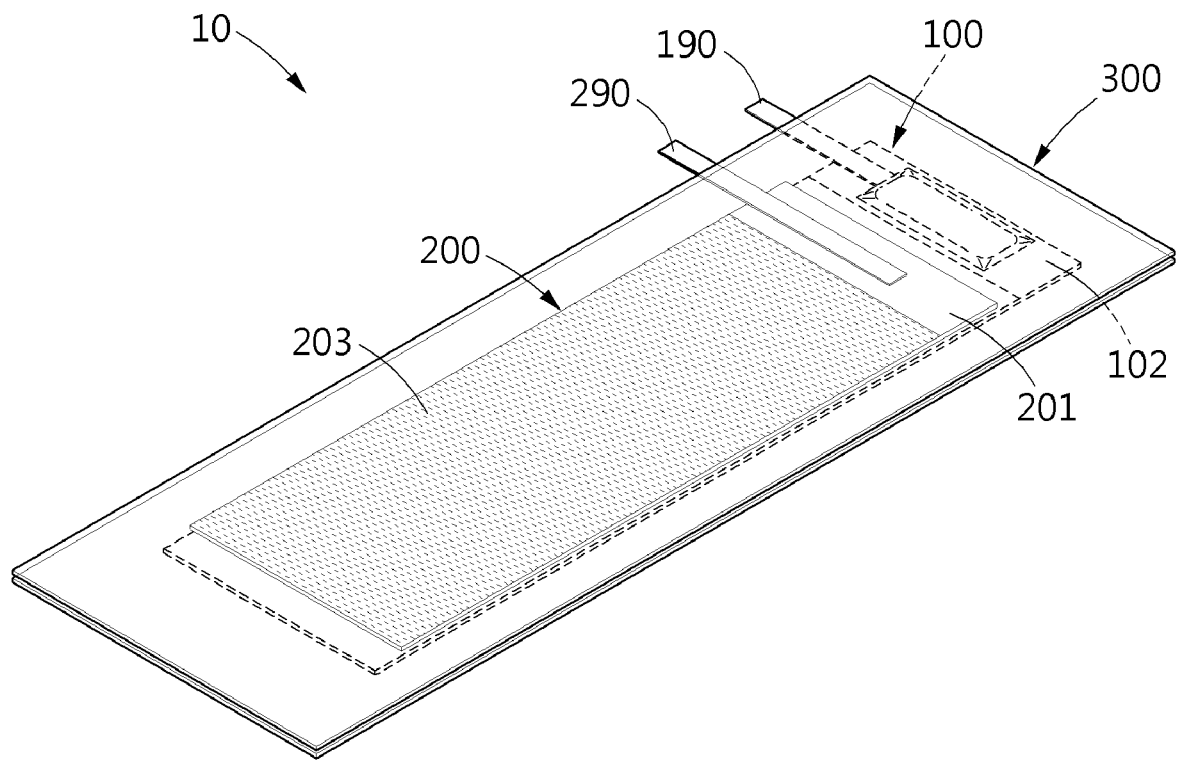
FIG. 14 is a perspective view illustrating an electrode assembly including a current collector for electrodes of FIG. 10.
Figure 15:
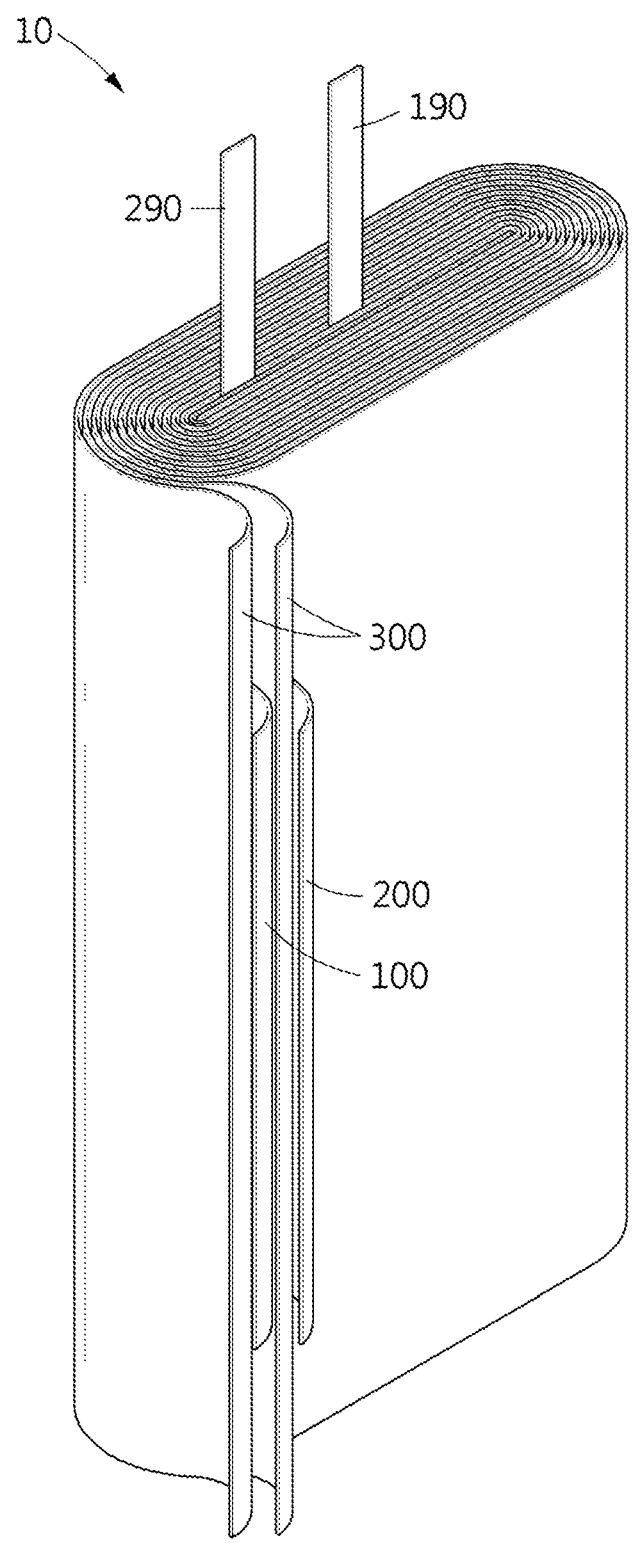
FIG. 15 is a perspective view illustrating a rolled-up state of an electrode assembly of FIG. 14.

FIG. 1 is a perspective view illustrating a current collector for electrodes according to an embodiment of the present invention; FIG. 2 is a perspective view illustrating a polymer film and a metal element of a current collector for electrodes according to an embodiment of the present invention; FIGS. 3 to 7 are cross-sectional views for explaining a process of forming a current collector for electrodes according to an embodiment of the present invention; FIGS. 8 and 9 are views for explaining a surface treatment of a current collector for electrodes according to an embodiment of the present invention; FIG. 10 is a perspective view illustrating a current collector for electrodes according to another embodiment of the present invention; FIGS. 11 and 12 are cross-sectional views illustrating a lead tab and a tab cover member of a current collector for electrodes of FIG. 10; FIG. 13 is an exploded perspective view illustrating an electrode assembly including a current collector for electrodes of FIG. 10; FIG. 14 is a perspective view illustrating an electrode assembly including a current collector for electrodes of FIG. 10; FIG. 15 is a perspective view illustrating a rolled-up state of an electrode assembly of FIG. 14; and FIGS. 16 to 22 are graphs of experiments of a performance of a lithium secondary battery including a current collector for electrodes according to the present invention.

Referring to FIGS. 1 to 9, a current collector 100 for electrodes according to an embodiment of the present invention has a resistance higher than a resistance of a current collector formed of a metal foil so that a limit current value of a current flowing through the current collector may be adjusted. Further, the current flow is interrupted by the damage of the polymer film so that the short current when internal short-circuit occurs in the secondary battery may be lowered.

As described above, a lithium secondary battery including the current collector 100 for electrodes according to the present invention may have a characteristic or a concept of max current limited battery (MCLB). Hereinafter, the current collector for electrodes according to the present invention which is capable of implementing MCLB will be described.

The current collector 100 for electrodes according to the present invention has a resistance which is higher than a resistance of a current collector of a battery of the related art, that is, a current collector formed of a metal foil so that a limit current may be adjusted and a current path collapses when the internal short-circuit occurs to lower the short current.

The current collector 100 for electrodes according to the present invention has a polymer film 101 as a basic material without using a metal foil and a metal with a small thickness is applied or coated on the polymer film 101.

Referring to FIGS. 1 to 7, the current collector 100 for electrodes according to an embodiment of the present invention may include a polymer film 101, at least one metal element 120 provided on at least one surface of the polymer film 101, a conductive material 102 provided on surfaces of the polymer film 101 and the metal element 120, and a lead tab 190 which is bonded or connected to the metal element 120.

As illustrated in FIG. 1, the polymer film 101 may be provided in a stripe shape to have a predetermined length. Here, the polymer film 101 is rolled/wound along the length direction (that is, a direction having a relatively larger length) to form an electrode assembly 10 to be described below.

The polymer film 101 may be provided with an insulator material such as polyethylene (PE), polypropylene (PP), polyethylene terephthalate (PET), or the like.

A thickness of the polymer film 101 may be 50 μm or smaller, and desirably, may be 1.4 μm or larger and 50 μm or smaller. The current collector 100 for electrodes according to the embodiment of the present invention may reduce the thickness or the weight of the battery as compared with a metal foil current collector of the related art. The polymer film 101 formed of an insulator having a thickness of 1.4 μm or larger and 50 μm or smaller is used as a basic configuration of the current collector 100 so that the overall thickness or weight of the lithium secondary battery including the current collector 100 for electrodes according to an embodiment of the present invention may be reduced.

In the meantime, the polymer film 101 may be desirably formed of a material which is melted at a temperature lower than 300° C. The lead tab 190 is welded to be fixed so that when the polymer film 101 is not melted at a temperature lower than a welding temperature of the lead tab 190, the lead tab 190 may not be coupled thereto. Accordingly, the polymer film 101 needs to have a melting point at which the polymer film is melted during the process of welding the lead tab 190 and desirably has a melting point lower than 300° C.

Referring to FIG. 1, the metal element 120 may be provided on a surface of the polymer film 101. In FIG. 1, the metal element 120 is provided in a position which is close to one end along a width direction (that is, a direction having a relatively smaller length) of the polymer film 101.

The metal element 120 may be provided on any one of both surfaces or on both surfaces of the polymer film 101.

The metal element 120 may serve to ensure the position on the polymer film 101 to which the lead tab 190 is welded. That is, the metal element 120 may serve as a connection unit of the lead tab 190.

Further, the metal element 120 may serve to ensure the conductivity of the current collector 100. When the polymer film 101 is long, the current needs to flow along the polymer film 101. However, if the polymer film 101 has a long length, a separate current path may be necessary. In this case, that is, when the polymer film 101 is formed to be long, the metal element 120 may increase the conductivity or serve as a current path.

The metal element 120 may be formed to have a thickness of 5 μm or larger. Here, it is sufficient to provide the metal element 120 in only a part of the polymer film 101. For example, as illustrated in FIG. 2, a metal element 120a having a substantially square shape is provided at a corner of the polymer film 101 or narrow stripe-shaped metal elements 120b and 120c may be provided to be long at one end in a width direction of the polymer film 101.

Although in FIG. 2, three metal elements 120a, 120b, and 120c are provided on the polymer film 101, the number or positions of metal elements 120 which are formed on the polymer film 101 are not specifically limited. However, when the lead tab 190 is welded to the metal element 120, it is desirable to determine the position of the metal element 120 to which the lead tab 190 is welded in consideration of the shape of the electrode assembly.

As described above, the metal element 120 is desirably formed by a metal thin film or metal foil with a thickness of 5 μm or larger, but is not necessarily limited thereto.

The metal element 120 may be provided as a thin film, a foil, a mesh, a woven metal wire or a fiber. For example, the metal element 120c provided at a lower end of the polymer film 101 in a width direction is formed by a plurality of short wires.

As described above, the metal element 120 of the current collector 100 for electrodes according to the embodiment of the present invention may serve as an electric path which ensures a welding position of the lead tab 190 or ensures a conductivity when the polymer film 101 is long.

In the meantime, in order to attach the metal element 120 onto the surface of the polymer film 101, an adhesive layer 130 (see FIGS. 3 and 4) may be formed on one surface of the metal element 120 which faces the polymer film 101.

The adhesive layer 130 may be formed of a material having an adhesive component such as poly vinyl acetate (PVA), poly vinyl alcohol (PVA), ethylene vinyl acetate (EVA), acrylate, or acid modified PP and may have a thickness smaller than 50 μm. Here, the adhesive layer 130 may be formed by two layers or more of polymer combinations together with the above-mentioned polymer.

Further, the adhesive layer 130 may be a polymer layer formed of a polymer material. Here, the adhesive layer 130 or the polymer layer may be provided over the entire surface of the metal element 120 or may be provided in only a part of the surface of the metal element 120 to be bonded to the polymer film 101.

In the meantime, a surface treatment including a chromate treatment may be performed on one surface of the metal element 120 which faces the polymer film 101. The surface treatment is essentially performed on the surface of the metal element 120. For example, before attaching the metal element 120 onto the polymer film 101, chrome-treatment (chromate treatment) may be performed, or non-chrome treatment (non-chromate treatment or binder treatment) may be performed, or the chrome-treatment and non-chrome treatment may be simultaneously performed, on the surface of the metal element 120.

In the current collector 100 for electrodes according to the embodiment of the present invention, an attached state of the metal element 120 and the adhesive layer 130 formed of EVA was tested. The metal element 120 with the EVA adhesive layer 130 attached thereto was put in an electrolyte solution at 85° C. and after 24 hours, the adhered state of the metal element 120 and the adhesive layer 130 was checked. A composition of the used electrolyte solution was 1.1 M LiPF6, EC/EMC: ½ (v/v %), and additives.

It was understood that even though the electrolyte solution was stored at 85° C., the attached state of the metal element 120 and the adhesive layer 130 formed of EVA was maintained. It was understood that when copper (Cu) metal element was subject to the surface treatment, the attached state with the adhesive layer 130 was maintained. It was understood that the adhesive layer 130 was released from the copper metal element on which the surface treatment was not performed.

A thickness of a part of the polymer film 101 at which the metal element 120 was provided is equal to or lower than 120 μm including the metal element 120 and a thickness of a part excluding the metal element 120 or a part which does not have the metal element 120 may be 100 μm or smaller.

In the meantime, the current collector 100 for electrodes according to the embodiment of the present invention may include a conductive material 102 which is provided on the surface of the polymer film 101 and/or the metal element 120.

The conductive material 102 may be provided by a metal such as copper (Cu), nickel (Ni), or aluminum (Al), or a conductive material such as carbon nano tube (CNT), or graphene and may be plated or coated on the surface of the polymer film 101. Accordingly, the conductive material 102 may also be called a conductive layer which forms an outermost surface of the current collector 100.

The conductive material 102 may be formed to adjust or lower a limit current or a maximum current of the current collector 100 for electrodes. In other words, the conductive material 102 may refer to a metal or a conductive material which is plated or coated on the surface of the polymer film 101 and the metal element 120 to control the conductivity of the current collector 100. If it is focused on a plated or coated state on the surface of the polymer film 101 and/or the metal element 120, the conductive material 102 may also be referred to as a conductive layer. Hereinafter, it is informed that the conductive material 102 is a concept including a conductive layer.

A coating amount or a coating thickness of the conductive material 102 which is applied or coated on the surface of the polymer film 101 and/or the metal element 120 is adjusted to control or lower a maximum current amount flowing through the current collector 100 and thus the stability of the lithium secondary battery may be increased and the stability of the battery at the time of short circuit may be ensured.

In other words, the limit current or the maximum current flowing through the current collector 100 may be adjusted by the thickness or the amount of the conductive material 102 formed on the surface of the polymer film 101 and/or the metal element 120. As described above, the characteristic or the concept of the max current limited battery (MCLB) of the lithium secondary battery may be implemented by the conductive material 102 of the current collector 100 for electrodes according to the present invention. Further, when a physical internal short-circuit occurs, the polymer film 101 is melted to interrupt the sharp generation of the current so that the stability of the battery may be improved.

The conductive material 102 may be formed on the surface of the polymer film 101 and/or the metal element 120 by various methods. For example, when the conductive material 102 is a metal, the conductive material may be formed on the surface of the polymer film 101 and/or the metal element 120 by sputtering, evaporation coating, or electroless plating. Further, the conductive material 102 may be plated or coated by two or more of sputtering, evaporation coating, and electroless plating or electro-plating.

Since the conductivity of the current collector 100 is controlled or the stability of the battery is ensured by an amount (weight) or a thickness with which the conductive material 102 is plated or coated, it is necessary to use a method of controlling or adjusting the thickness or the weight of the conductive material 102 when the plating or the coating is performed.

When the conductive material 102 is a metal, both the sputtering and the electro-plating may be desirably used to adjust the plating or coating thickness or weight of the conductive material 102. That is, after thinly plating or coating the conductive material 102 on the surface of the polymer film 101 and/or the metal element 120 using the sputtering, the conductive material 102 is formed again thereon using electro-plating to easily control or adjust the plating thickness or weight of the conductive material 102.

Since the sputtering method is more expensive than the electro-plating so that after thinly plating the conductive material 102 using the sputtering, the conductive material 102 is plated using the electro-plating. As described above, it is advantageous in terms of economics to use both the sputtering and the electro-plating together and to easily adjust the thickness or the weight of the conductive material 102.

The thickness of the conductive material 102 which is plated or coated on the surface of the polymer film 101 and/or the metal element 120 may be determined by the lengths of the lead tab 190 and the electrode (current collector). For example, when the length of the electrode (current collector) is increased, the plating thickness of the conductive material 102 may be desirably increased.

The conductive material 102 may be formed on only one surface or both surfaces of the polymer film 101. At this time, the conductive material 102 may be desirably formed to have a thickness of 0.5 μm for a minimum cross-section and 2 μm for a maximum cross-section.

In the meantime, the conductive material 102 formed on the surface of the polymer film 101 may be plated or coated on the surface of the polymer film 101 or the conductive material 102 formed on the surface of the polymer film 101 may penetrate or pass through the polymer film 101. For example, when the polymer film 101 is formed of a porous material, the conductive material 102 which is plated or coated on any one surface of the surfaces of the polymer film 101 may reach the other surface through the pore of the polymer film 101.

When the conductive material 102 is plated or coated using the electroless plating method, even though the conductive material 102 is plated or coated on only one surface of the porous polymer film 101, the conductive material 102 penetrates into the polymer film 101 to reach the other surface. Therefore, even though the conductive material 102 is plated or coated on only one surface of the polymer film 101, the conductivity may be ensured on both surfaces of the polymer film 101.

Further, the conductive material 102 is plated or coated after attaching the metal element 120 to the polymer film 101 so that the conductive material 102 is also plated or coated on the surface of the metal element 120. At this time, when the metal element 120 is a thin metal foil or a metal mesh and the polymer film 101 is a porous material, the conductive material 102 formed on the surface of the metal element 120 passes through the metal element 120 to reach the other surface of the polymer film 101.

However, in some cases, the pores of the porous polymer film 101 need to be removed. In this case, when the electroless plating is performed to plate or coat with the conductive material 102, after performing the electroless plating, the polymer film 101 is pressed or heated to remove the pores.

In the current collector 100 for electrodes according to an embodiment of the present invention, the current may flow by the conductive material 102 so that the plated or coated state of the conductive material 102 on the surface of the polymer film 101 needs to be satisfactorily maintained. To this end, it is desirable to increase the binding force of the conductive material 102 and the polymer film 101 by performing the surface treatment of the polymer film 101.

When the binding force between the conductive material 102 and the polymer film 101 is not good, the conductive material 102 may be separated or deviated from the surface of the polymer film 101 in a state in which the electrolyte solution is injected. Therefore, it is important to increase the binding force between the conductive material 102 and the polymer film 101.

The surface treatment may be performed on the surface of the polymer film 101 to increase the adhesiveness or the binding force with the conductive material 102.

In order to increase the binding force of the conductive material 102 and the polymer film 101, a corona treatment or an Ni/Cr treatment is performed on the surface of the polymer film 101. Here, when the Ni/Cr treatment is performed, Ni or Cr or an Ni/Cr alloy is desirably coated on the polymer film 101 with a thickness of 10 nm or less.

For example, when the conductive material 102 which is plated on the surface of the polymer film 101 is copper (Cu), in order to increase the binding force between copper and the polymer film 101, Ni or Cr or an Ni/Cr alloy is desirably coated on the surface of the polymer film 101 with a thickness of 10 nm or less and copper is plated on the Ni/Cr-treated surface to increase the binding force between copper which is the conductive material 102 and the polymer film 101. That is, after coating Ni/Cr on the polymer film 101 first, copper is coated so that the binding force between copper which is the conductive material 102 and the polymer film 101 may be increased.

Further, chrome (Cr) is coated on the surface of copper which is the conductive material 102 plated on the surface of the polymer film 101 to have a thickness of 10 nm or less to improve the binding force of a binder.

FIG. 8 is a view illustrating an aluminum surface treatment when the conductive material 102 is aluminum (Al) as an example. In order to enhance a corrosion resistance of aluminum which is the conductive material 102, chromate treatment L1 by which chrome (Cr) is coated on aluminum is performed and in order to improve the adhesiveness, a treatment L2 of coating an epoxy type non-Cr is performed on the chromate treatment L1. Here, the Non-Cr treatment L2 is performed by coating a compound layer including zirconium (Zr) or a compound layer including silicon (Si). The thickness in the chromate treatment L1 and the non-Cr treatment L2 may be desirably several nm to several tens of nm.

FIG. 9 is a view illustrating a nickel surface treatment when the conductive material 102 is nickel (Ni) as an example. In order to improve the adhesiveness of the conductive material, a polymer type non-Cr may be coated on a surface of nickel. Here, in the non-Cr coating layer, metals are dispersed in the polymer. The non-Cr treatment may be performed with a thickness of several nm.

In the meantime, the current collector 100 for electrodes according to the embodiment of the present invention includes a lead tab 190 for connection with external devices.

In the metal foil current collector of the related art, the lead tab may be directly welded to the metal foil. However, in the current collector 100 for electrodes according to the embodiment of the present invention, the polymer film 101 is a component corresponding to the metal foil of the related art so that it is not possible to directly weld the lead tab to the polymer film 101. In the current collector 100 for electrodes according to the embodiment of the present invention, the metal element 120 is attached onto the surface of the polymer film 101 and the lead tab 190 is welded to the metal element 120, thereby solving this problem.

In the current collector 100 for electrodes according to the embodiment of the present invention, the lead tab 190 may be welded to the metal element 120 by ultrasonic welding, laser welding, or spot welding.

When lead tab 190 is welded to the metal element 120, the polymer film 101 below the metal element 120 is melted by the welding heat. Since the polymer film 101 is melted so that the lead tab 190 may be electrically connected to the conductive material 102. That is, the lead tab 190 is welded to the metal element 120 and the polymer film 101 is melted so that the lead tab may be electrically connected to the metal element 120 and the conductive material 102.

Figure 3:
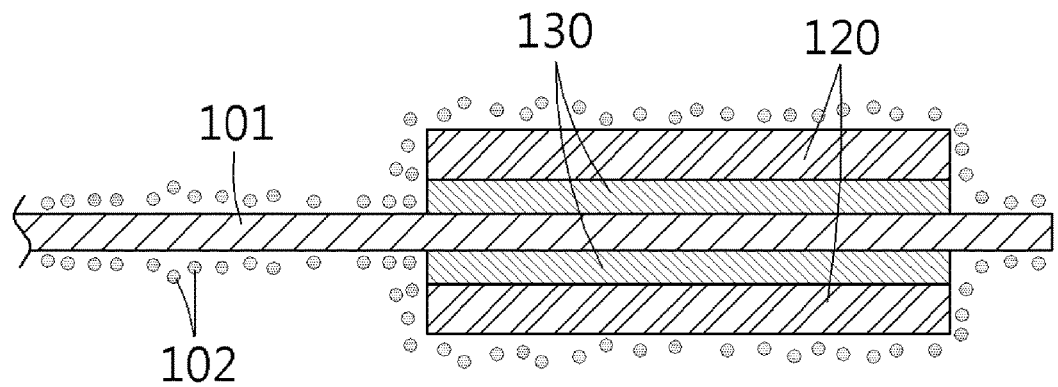
FIGS. 3 to 7 are cross-sectional views for explaining a process of forming a current collector for electrodes according to an embodiment of the present invention.
Figure 4:
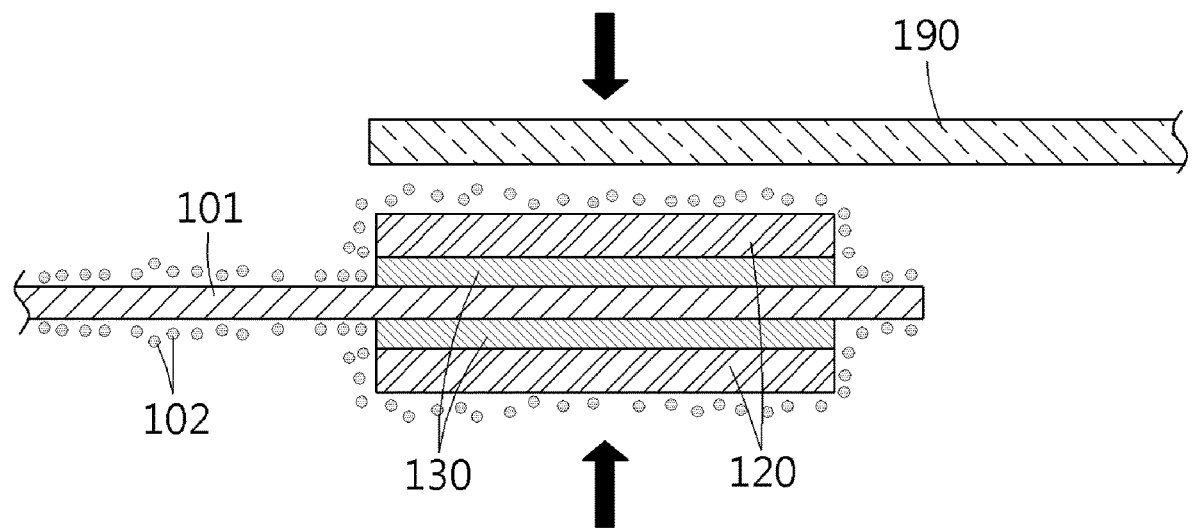

As illustrated in FIGS. 3 and 4, the metal element 120 and the conductive material 102 are provided on both surfaces of the polymer film 101 and the metal elements 120 provided on both surfaces of the polymer film 101 may be formed in the same position.

Referring to FIG. 3, it is understood that the metal elements 120 are located on both an upper surface and a lower surface of the polymer film 101 and the metal elements 120 are provided in the same positions or symmetrical positions. After attaching the metal elements 120 in the same position on both the upper surface and the lower surface of the polymer film 101 by the adhesive layer 130, the conductive material 102 is plated or coated on the surface of the polymer film 101 and the metal element 120. At this time, the conductive material 102 is plated or coated on both the upper surface and the lower surface of the polymer film 101 and also plated or coated on the surface of the metal element 120 provided on both the upper surface and the lower surface of the polymer film 101.

Referring to FIG. 4, the lead tab 190 is connected to any one of the metal elements 120 provided on both the upper surface and the lower surface of the polymer film 101. The lead tab 190 is connected to the metal element 120 while the conductive material 102 is applied or coated on the surface of the metal element 120.

As illustrated in FIG. 4, when the lead tab 190 is welded to any one of the metal elements 120 provided on both surfaces of the polymer film 101, the polymer film 101 is melted so that the metal elements 120 provided on both surfaces of the polymer film 101 are connected to each other and as a result, the lead tab 190 may be simultaneously electrically connected to the conductive material 102 provided on both surfaces of the polymer film 101.

Figure 5:
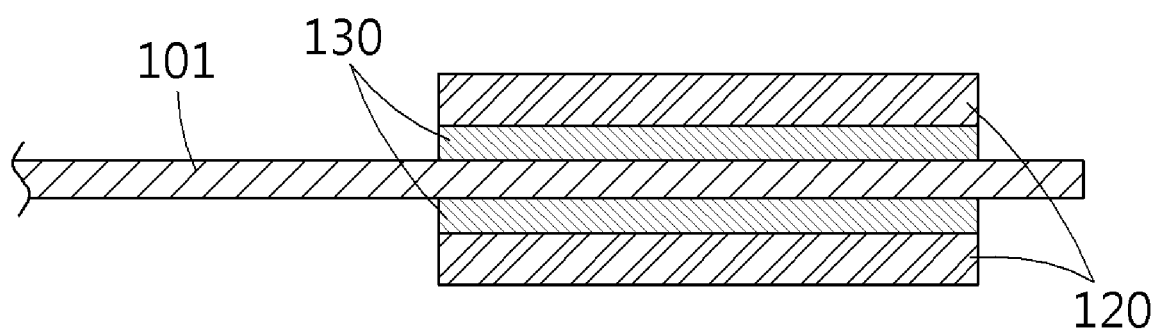
Figure 6:
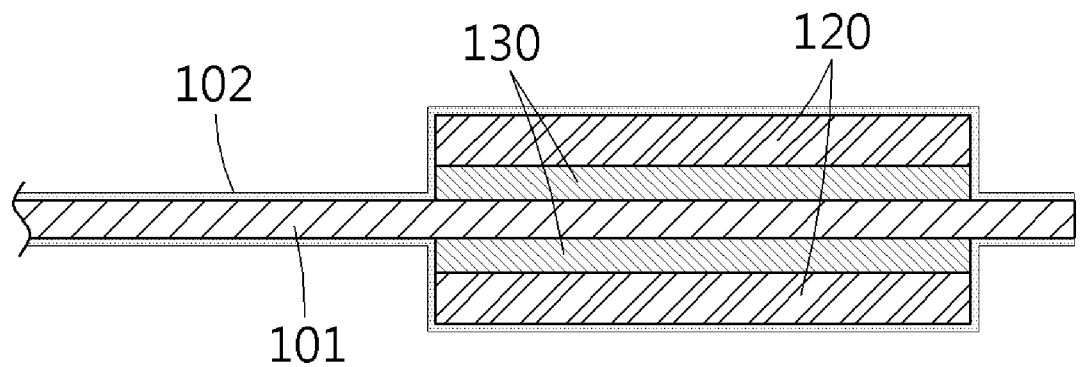
Figure 7:
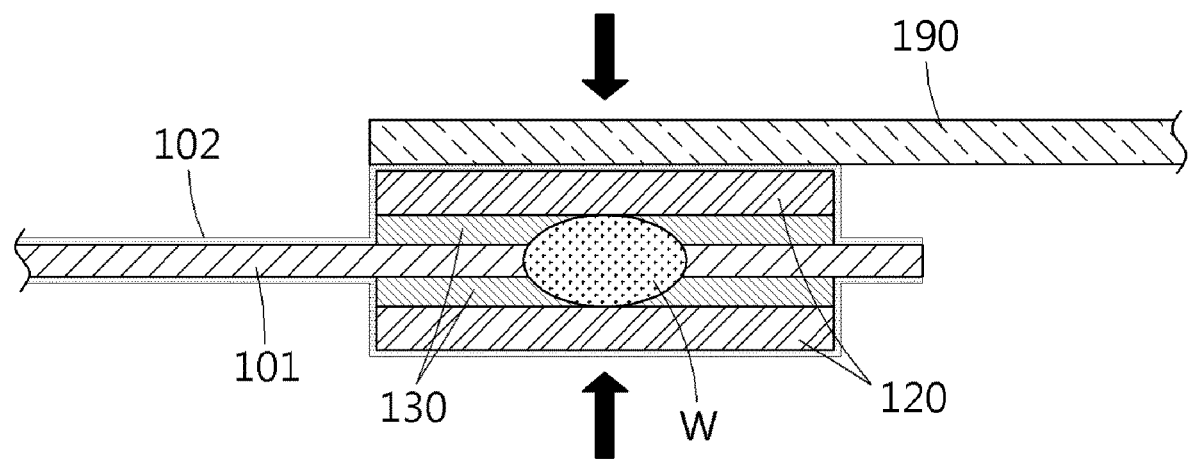

In a state in which the metal element 120 and the conductive material 102 are provided on both the upper and lower surfaces of the polymer film 101 by means of the processes of FIGS. 5 and 6, when the lead tab 190 is welded to the metal element 120 provided on the upper surface of the polymer film 101 by ultrasonic welding, laser welding, or spot welding, as illustrated in FIG. 7, a part (see W of FIG. 7) of the polymer film 101 is melted. It has been mentioned above that the polymer film 101 desirably has a melting point lower than 300° C. Since the welding heat generated when the lead tab 190 is welded is higher than 300° C., the polymer film 101 may be melted during the welding process.

As described above, in the part where the polymer film 101 is melted, the polymer film 101 does not exist so that upper and lower metal elements 120 may be in direct contact with each other. At this time, the metal elements 120 are also melted by the melting heat so that upper and lower metal elements 120 may be bonded. Accordingly, in the part where the polymer film 101 is melted to disappear, the upper and lower metal elements 120 are melted to be directly coupled so that the lead tab 190 which is welded to any one of the metal elements 120 may be electrically connected not only to the upper and lower metal elements 120, but also to the conductive material 102 formed on the upper and lower surfaces of the polymer film 101.

In the current collector 100 for electrodes according to the embodiment of the present invention, even though a part of the polymer film 101 is melted by the welding heat, the metal element 120 maintains a connected state with the polymer film 101 so that the lead tab 190 may be connected.

However, in some cases, even in a state in which the polymer film 101 is not melted, the lead tab 190 may be welded to the metal element 120. When the polymer film 101 is a porous material, the conductive material 102 penetrates through the polymer film 101 by means of the pores to be electrically connected to both surfaces of the polymer film 101 so that the lead tab 190 connected to the metal element 120 in a state in which the polymer film 101 is not melted may be electrically connected to the conductive material 102 of the polymer film 101.

In the meantime, in a part where the lead tab 190 is welded, the electrical connection of the metal element 120 and the conductive material 102 may be weakened. For example, when the conductive material 102 formed on the surface of the metal element 120 is melted by the melting heat, the electrical connection of the metal element 120 and the conductive material 102 may be degraded. According to the present invention, in order to prevent the electrical connection of the metal element 120 and the conductive material 102 in a portion where the lead tab 190 is welded from being degraded or to enhance the electrical connection of the metal element 120 and the conductive material 102, a tab cover member 180 is used.

Referring to a current collector 100 for electrodes according to another embodiment of the present invention illustrated in FIGS. 10, 11, and 12, a tab cover member 180 is provided in the polymer film 101 to cover the lead tab 190 and the tab cover member 180 may be formed to be in contact with the conductive material 102, the metal element 120, and the lead tab 190.

Here, the tab cover member 180 may be desirably a conductive tape which covers a portion where the lead tab 190, the metal element 120, and the conductive material 102 are electrically connected to each other.

Between an inner surface and an outer surface of the tab cover member 180, the inner surface which is in contact with the lead tab 190, the metal element 120, and the conductive material 102 is formed of a material having conductivity to enhance the conductivity of the lead tab 190. That is, the inner surface of the tab cover member 180 having a conductivity is simultaneously in contact with the lead tab 190, the metal element 120, and the conductive material 102 so that the electrical connection of the metal element 120 and the conductive material 102 may be maintained or enhanced by means of the inner surface of the tab cover member 180. As a result, the conductivity between the lead tab 190, the metal element 120, and the conductive material 102 may be enhanced.

In contrast, between the inner surface and the outer surface of the tab cover member 180, the outer surface which is not in contact with the lead tab 190, the metal element 120, and the conductive material 102 is desirably formed of a material having non-conductivity.

As described above, the tab cover member 180 includes a conductive material to electrically connect the metal element 120 and the conductive material 102 or enhance the conductivity between the metal element 120 and the conductive material 102.

Referring to FIG. 11, the tab cover member 180 includes a first layer 180a which is formed of a conductive material and a second layer 180b which is formed on a top surface of the first layer 180a and is formed of a non-conductive material and the first layer 180a may be provided so as to be in contact with the conductive material 102, the metal element 120, and the lead tab 190.

Here, the first layer 180a formed of a conductive material may include a metal or carbon particles or may be plated with a metal. Further, a conductive adhesive agent is applied on the surface of the first layer 180a which is in contact with the lead tab 190, the metal element 120, and the conductive material 102 or the first layer 180a itself may be formed as a conductive adhesive layer.

As described above, since the connection part of the lead tab 190 is covered by the tab cover member 180 having a conductivity, not only the conductivity between the lead tab 190, the metal element 120, and the conductive material 102 is enhanced, but also the connection part of the lead tab 190 may be protected.

In the meantime, referring to FIG. 12, the tab cover member 180 is provided to cover the metal element 120 and the conductive material 102 provided on one surface of the polymer film 101 which faces the lead tab 190, that is, one surface of the polymer film on which the lead tab 190 is not provided, between both surfaces of the polymer film 101, to electrically connect the metal element 120 and the conductive material 102 or enhance the conductivity between the metal element 120 and the conductive material 102. That is, when the metal element 120 and the conductive material 102 are provided on both surfaces of the polymer film 101, the tab cover member 180 may be provided on both surfaces of the polymer film 101 to enhance the electrical connection of the metal element 120 and the conductive material 102.

FIGS. 13 to 15 illustrate an electrode assembly 10 including the current collector 100 for electrodes according to an embodiment of the present invention. In FIGS. 13 to 15, the current collector 100 for electrodes according to the present invention is an anode current collector. In order to be used for the electrode assembly 10, anode active materials 103 need to be applied on the surface of the current collector 100 for electrodes.

In a cathode current collector 200, a cathode active material 203 is applied on a cathode metal foil 201 and a cathode lead tab 290 is connected to one end in a length direction.

A separator 300 is disposed between the cathode current collector 200 and the anode current collector 100. As illustrated in FIG. 13, when the separator 300, the cathode current collector 200, the separator 300, and the anode current collector 100 are laminated in this order, a state as illustrated in FIG. 9 is obtained.

In a state as illustrated in FIG. 14, when the laminated components are rolled with respect to the cathode lead tab 290 and an anode lead tab 190, a jelly-roll type electrode assembly 10 as illustrated in FIG. 15 is obtained. The jelly-roll type electrode assembly 10 is put into an exterior material (not illustrated) and an electrolyte solution is injected to complete the lithium secondary battery.

In the current collector 100 for electrodes according to the present invention, a surface resistance ($\rho s$) of a part where the conductive material 102 is plated or coated on the polymer film 101 may be desirably 0.5 ohm/sq or lower and 0.005 ohm/sq or higher.

FIGS. 16 to 19 and FIGS. 20 to 22 are graphs of experiments for performance of a lithium secondary battery including a current collector for electrodes according to the present invention.

Figure 16:
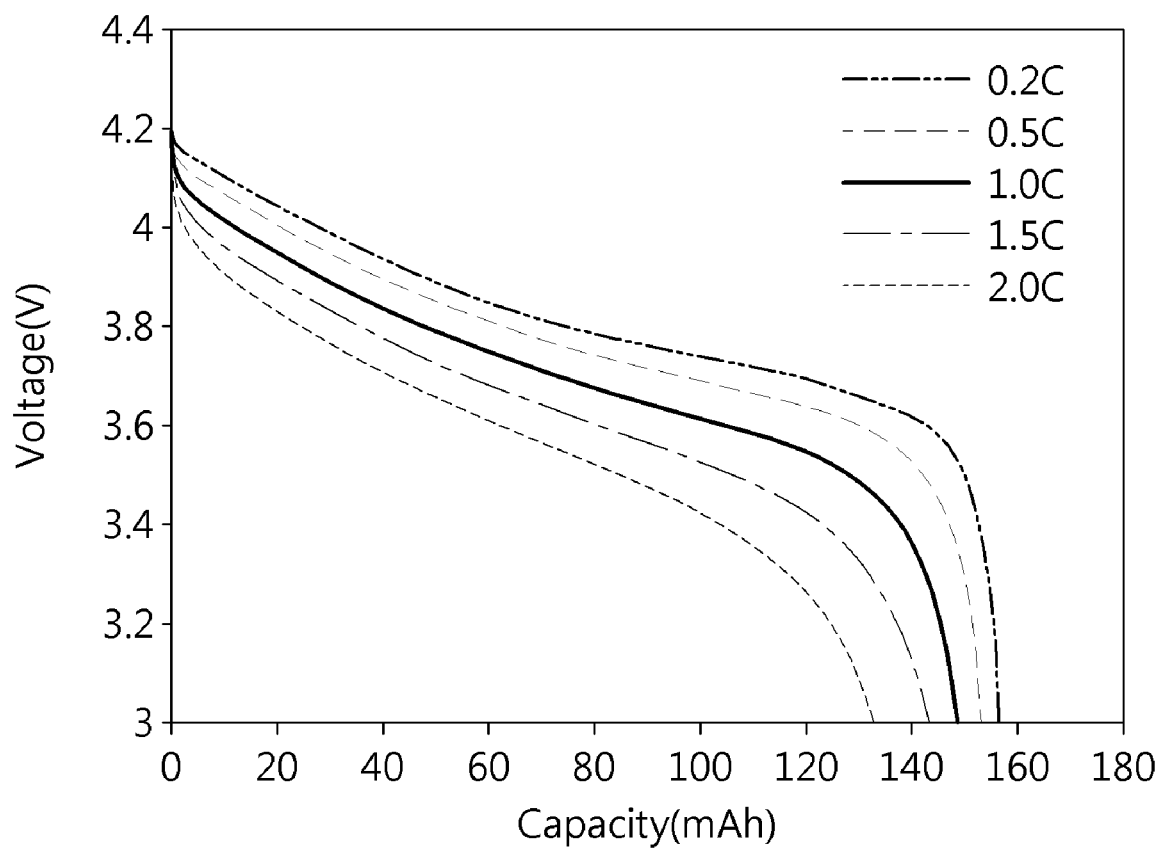
FIGS. 16 to 22 are graphs of experiments of a performance of a lithium secondary battery including a current collector for electrodes according to the present invention.
Figure 17:
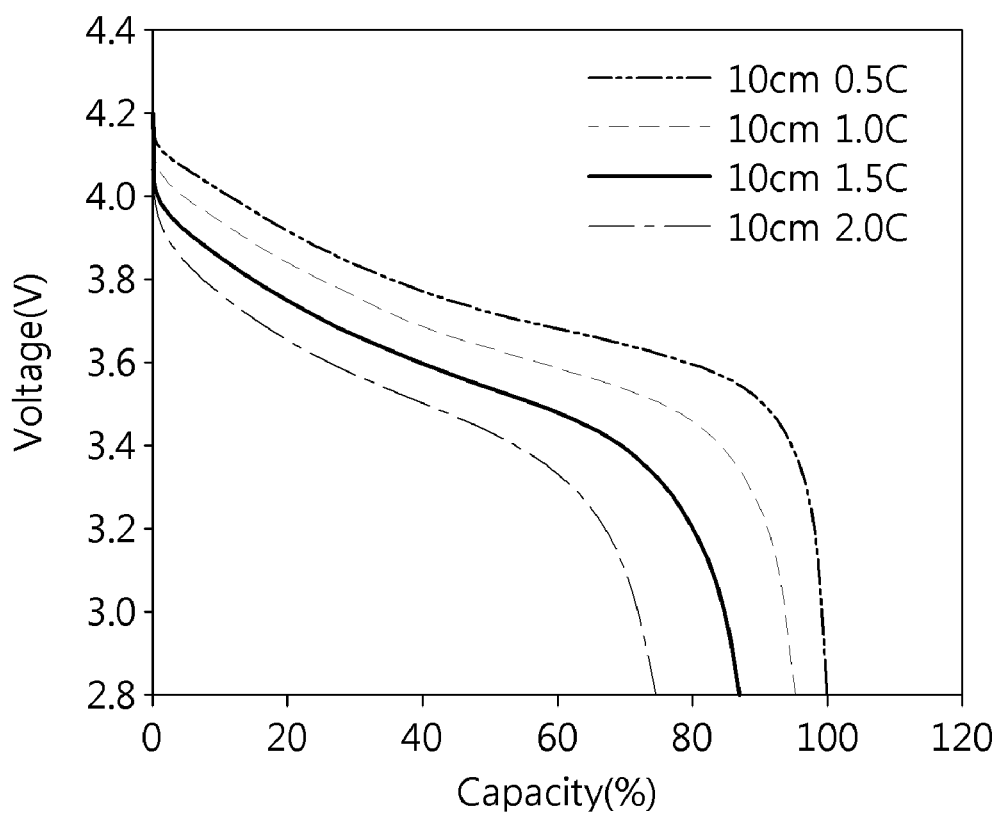
Figure 18:
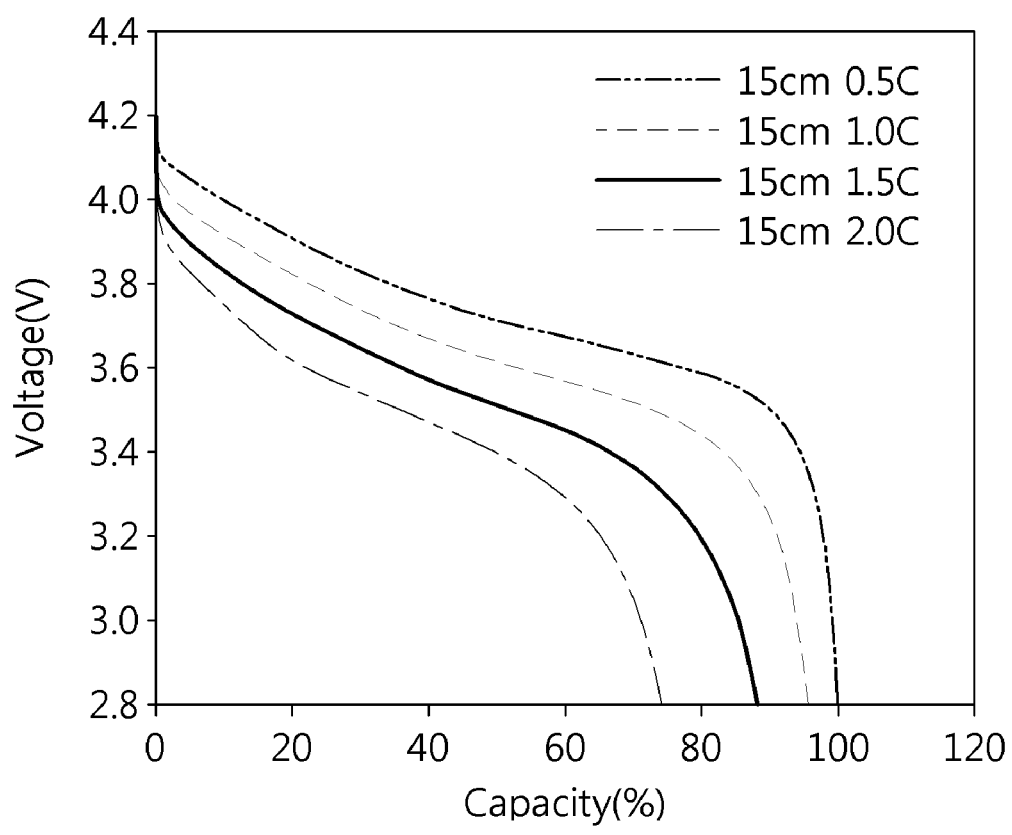
Figure 19:
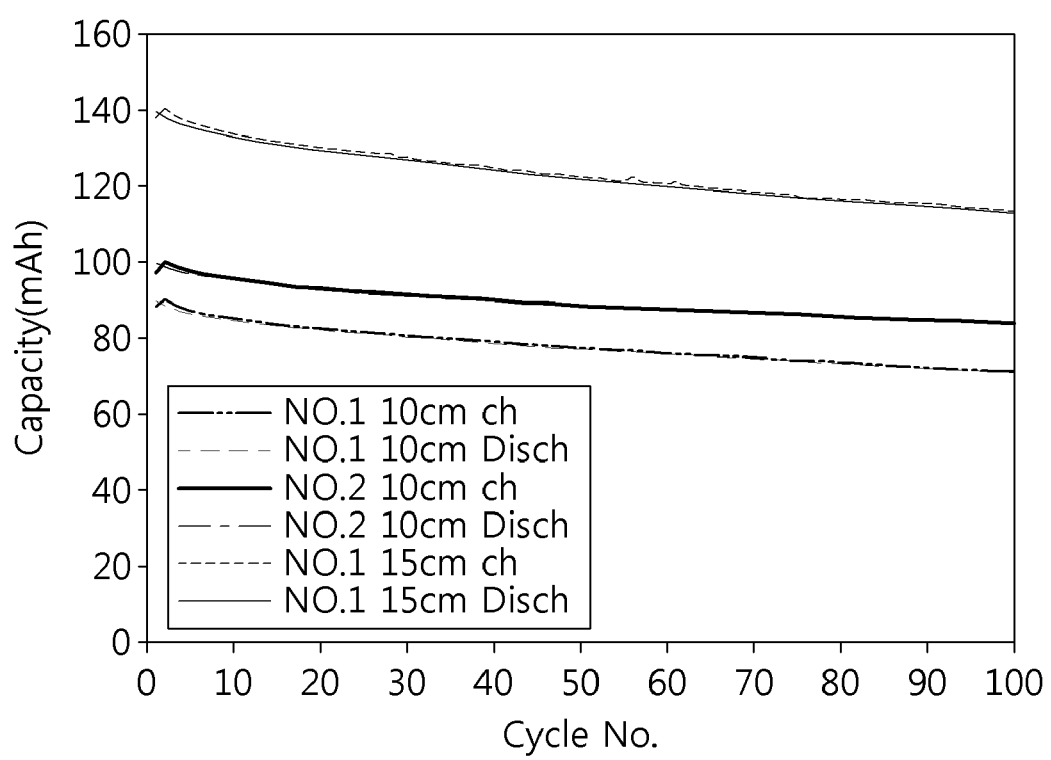

FIG. 16 is a C-rate (current rate) test result of a battery which uses a metal foil current collector of the related art. FIGS. 17 and 18 are C-rate test results of a battery which uses a current collector for electrodes according to the present invention. Here, FIG. 16 is a C-rate test result of a battery using an anode current collector including a copper foil with a width of 2 cm and a length of 15 cm, FIG. 17 is a C-rate test result of a battery using an anode current collector including a PET polymer film with a width of 2 cm and a length of 10 cm, and FIG. 18 is a C-rate test result of a battery using an anode current collector including a PET polymer film with a width of 2 cm and a length of 15 cm. Further, FIG. 19 is an experiment result showing a life cycle characteristic.

An experimental result is described in following Table 1.

TABLE 1

| Classification | | 0.5 C. | 1.0 C. | 1.5 C. | 2.0 C. |
|---|---|---|---|---|---|
| (a) | mAh | 153.2 | 148.8 | 143.3 | 133.0 |
|  | % | 100% | 97% | 93% | 87% |
| (b) | mAh | 99.702 | 95.191 | 87.128 | 74.675 |
|  | % | 100% | 95% | 87% | 75% |
| (c) | mAh | 153.496 | 147.148 | 135.983 | 114.690 |
|  | % | 100% | 96% | 89% | 75% |

Figure 20:
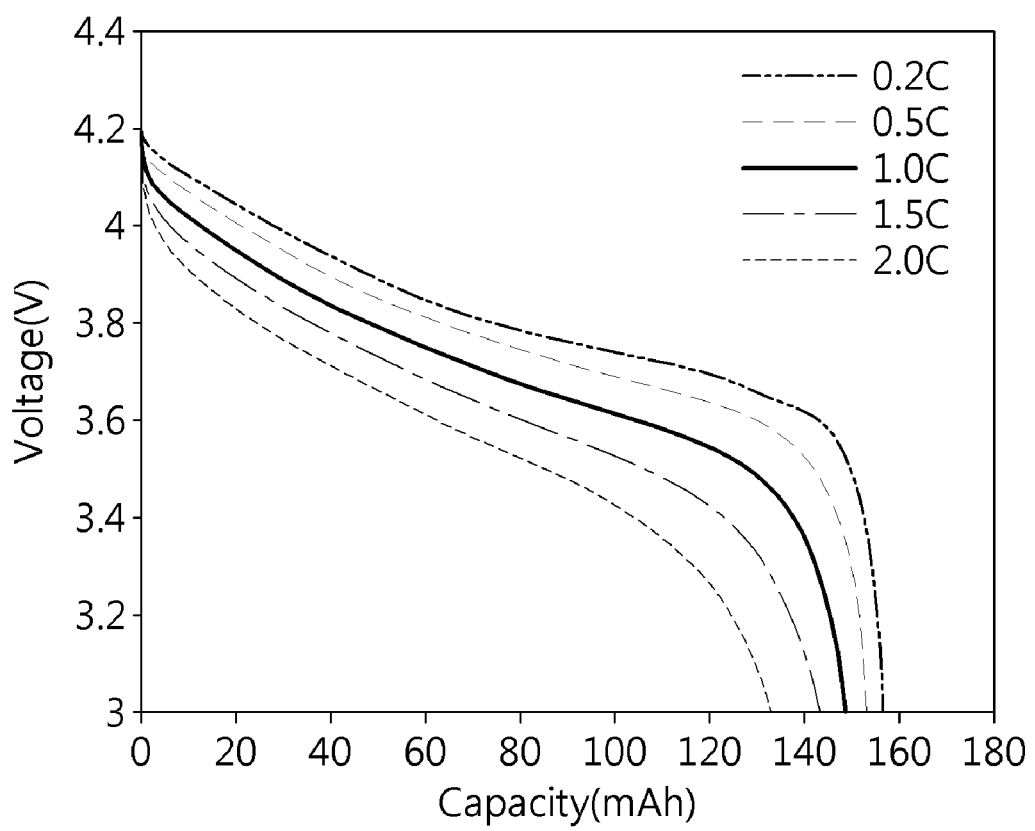
Figure 21:
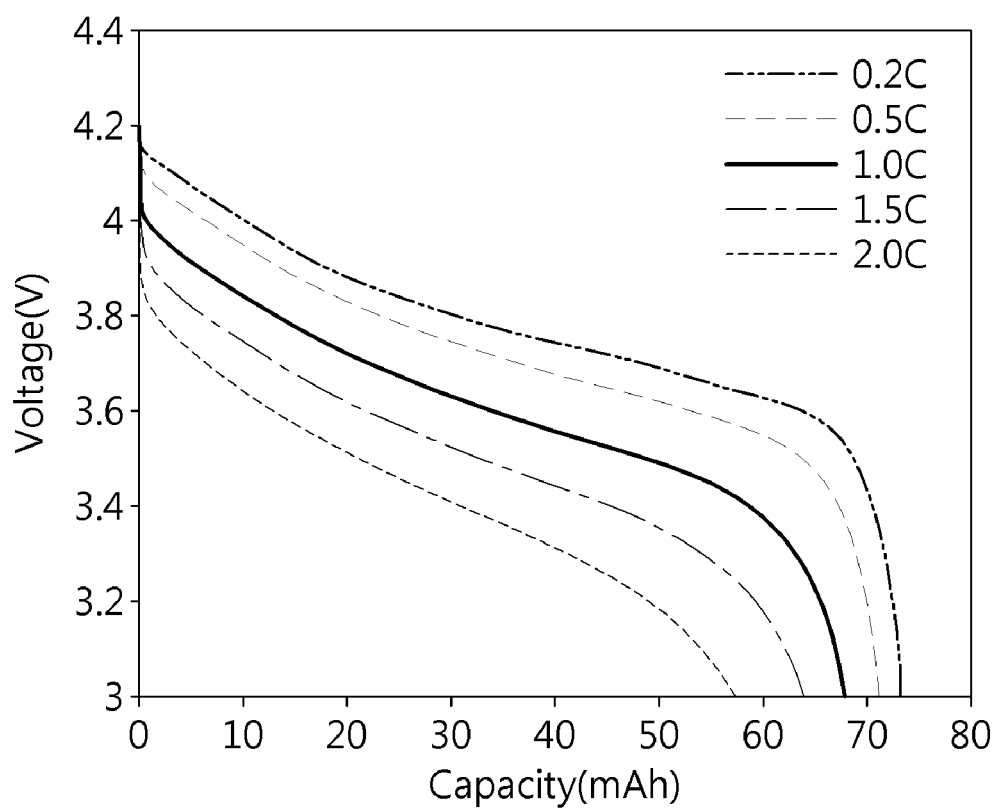
Figure 22:
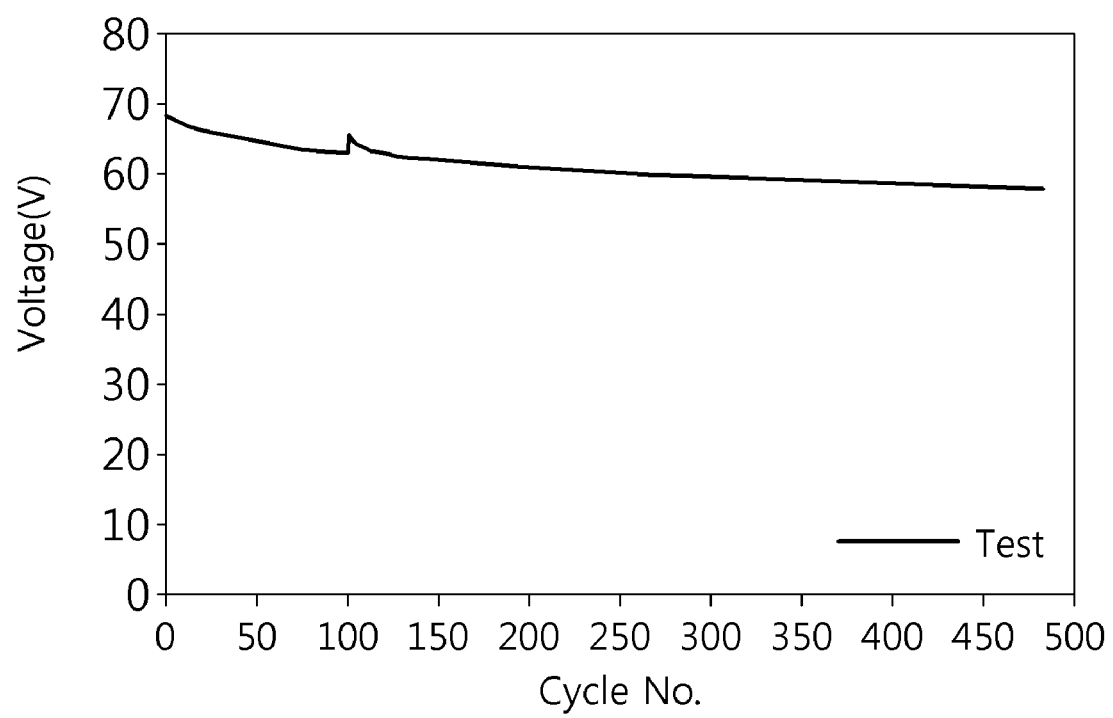

FIG. 20 is a C-rate (current rate) test result of a battery using a metal foil current collector of the related art and FIG. 21 is a C-rate test result of a battery using a current collector for electrodes according to the present invention. Here, FIG. 21 is a C-rate test result of a battery which uses a current collector in which copper (Cu) is plated on a PP polymer film by electroless plating as an anode current collector and uses an aluminum foil cathode current collector. Further, FIG. 22 is an experiment result showing a life cycle characteristic.

An experimental result is described in following Table 2.

TABLE 2

| Classification | | 0.2 C | 0.5 C | 1.0 C | 1.5 C | 2.0 C |
|---|---|---|---|---|---|---|
| (a) | mAh | 156.644 | 153.187 | 148.754 | 143.282 | 133.026 |
|  | % | 100% | 98% | 95% | 91% | 85% |
| (b) | mAh | 73.354 | 71.223 | 68.002 | 64.168 | 57.572 |
|  | % | 100% | 97% | 93% | 87% | 78% |

According to the results of FIGS. 16 to 19 and FIGS. 20 to 22, as compared with the battery of the related art, it is understood that in the case of the battery using the current collector for electrodes according to the present invention, a rate characteristic is lowered at a high C-rate as compared with the battery of the related art, but the rate characteristic at 1C has no problem. Accordingly, it is understood that the lithium secondary battery (see FIGS. 16, 18, and 21) which uses the current collector for electrodes according to the present invention may function as a battery similar to the lithium secondary battery (FIGS. 16 and 20) of the related art. Further, referring to FIGS. 19 and 22, it is understood that the life cycle of the battery which uses the current collector for electrodes according to the present invention is not shorter than the battery of the related art.

The specified matters and limited exemplary embodiments and drawings such as specific elements in the exemplary embodiment of the present invention have been disclosed for broader understanding of the present invention, but the present invention is not limited to the exemplary embodiments, and various modifications, additions and substitutions are possible from the disclosure by those skilled in the art. The spirit of the present invention is defined by the appended claims rather than by the description preceding them, and all changes and modifications that fall within metes and bounds of the claims, or equivalents of such metes and bounds are therefore intended to be embraced by the range of the spirit of the present invention.

The invention claimed is:

1. A current collector for electrodes, comprising:
a polymer film;
a metal element provided on at least one surface of the polymer film;
a conductive material provided by aluminum formed to be plated or coated on surfaces of the polymer film and the metal element; and
a lead tab which is bonded or connected to the metal element,
wherein the metal element is located inside an edge of the polymer film without protruding or being exposed to an outside of the edge of the polymer film,
wherein the plated or coated conductive material has a thickness of 0.5 μm for a minimum cross-section and 2 μm for a maximum cross-section, and
wherein a coating amount or the coating thickness of the plated or coated conductive material is adjusted to control or lower a maximum current amount flowing through the current collector.

2. The current collector for electrodes according to claim 1, wherein the metal element is provided in the form of a thin film, a foil, a mesh, a wire, or a fiber.

3. The current collector for electrodes according to claim 1, wherein the metal element is formed to ensure a welding position of the lead tab or serve as an electric path which ensures the conductivity when the polymer film is longer than the metal element.

4. The current collector for electrodes according to claim 3, wherein a surface treatment including chromate treatment is performed on one surface of the metal element which faces the polymer film.

5. The current collector for electrodes according to claim 3, wherein an adhesive film is formed on one surface of the metal element which faces the polymer film.

6. The current collector for electrodes according to claim 5, wherein a surface treatment is performed on the surface of the polymer film to increase an adhesiveness or a binding force with the conductive material.

7. The current collector for electrodes according to claim 1, wherein the thickness of the conductive material which is plated or coated on the surfaces of the polymer film and the metal element is determined by a length of the lead tab and a length of the current collector.

8. The current collector for electrodes according to claim 1, wherein the lead tab is welded to the metal element to be electrically connected to the metal element and the conductive material.

9. The current collector for electrodes according to claim 8, wherein the metal element and the conductive material are provided on both surfaces of the polymer film to provide an upper metal element and a lower metal element, and wherein the metal element provided on both surfaces of the polymer film is formed on the same position on both surfaces of the polymer film.

10. The current collector for electrodes according to claim 9, wherein when the lead tab is welded to any one of the upper and lower metal elements provided on both surfaces of the polymer film, in the part where the polymer film is melted to disappear, the upper and lower metal elements are melted to be directly coupled so that the lead tab which is welded to any one of the upper and lower metal elements is electrically connected not only to the upper and lower metal elements, but also to the conductive material formed on upper and lower surfaces of the polymer film.

11. The current collector for electrodes according to claim 1, wherein a tab cover member which covers the lead tab is provided on the polymer film and the tab cover member is formed to be in contact with the conductive material, the metal element, and the lead tab.

12. The current collector for electrodes according to claim 11, wherein the tab cover member electrically connects the metal element and the conductive material or enhance conductivity between the metal element and the conductive material.

13. The current collector for electrodes according to claim 12, wherein the tab cover member includes a first layer formed of the conductive material and a second layer which is provided on a top surface of the first layer and is formed of a non-conductive material and the first layer is provided to be in contact with the conductive material, the metal element, and the lead tab.

14. The current collector for electrodes according to claim 13, wherein the tab cover member is provided to cover the metal element and the conductive material provided on one surface of the polymer film which faces the lead tab to electrically connect the metal element and the conductive material or enhance the conductivity between the metal element and the conductive material.

\* \* \* \* \*